United States Patent
Park et al.

(10) Patent No.: US 7,446,701 B2
(45) Date of Patent: Nov. 4, 2008

(54) METHOD AND APPARATUS FOR TRACKING LOCATION OF USER EQUIPMENT BY USING INTEGRATED GPS AND TDOA SCHEME

(75) Inventors: Byung-Jun Park, Sunwon-si (KR); Chang-Soo Lim, Gangnam-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 153 days.

(21) Appl. No.: 11/270,735

(22) Filed: Nov. 10, 2005

(65) Prior Publication Data

US 2006/0232466 A1    Oct. 19, 2006

(30) Foreign Application Priority Data

Nov. 11, 2004    (KR) .................. 10-2004-0092152

(51) Int. Cl.
*G01S 5/00* (2006.01)
*G01S 1/00* (2006.01)

(52) U.S. Cl. .................. 342/357.07; 342/357.02; 342/357.1

(58) Field of Classification Search ................ 342/357.01–357.17, 387
See application file for complete search history.

(56) References Cited

U.S. PATENT DOCUMENTS

| 4,268,830 | A | * | 5/1981 | Brodeur | 342/389 |
| 5,043,736 | A | * | 8/1991 | Darnell et al. | 342/357.1 |
| 5,479,482 | A | * | 12/1995 | Grimes | 455/556.1 |
| 5,512,908 | A | * | 4/1996 | Herrick | 342/387 |
| 5,523,763 | A | * | 6/1996 | Loomis | 342/357.03 |
| 5,708,658 | A | * | 1/1998 | Sugita | 370/335 |
| 5,884,215 | A | * | 3/1999 | Birchler et al. | 701/207 |
| 5,929,806 | A | * | 7/1999 | Birchler et al. | 342/357.08 |
| 5,982,324 | A |   | 11/1999 | Watters et al. | |
| 6,014,102 | A |   | 1/2000 | Mitzlaff et al. | |
| 6,230,018 | B1 | * | 5/2001 | Watters et al. | 455/456.3 |
| 6,252,543 | B1 | * | 6/2001 | Camp | 342/357.06 |
| 6,300,904 | B1 | * | 10/2001 | Dvorak et al. | 342/457 |
| 6,429,815 | B1 | * | 8/2002 | Soliman | 342/357.15 |
| 6,430,416 | B1 | * | 8/2002 | Loomis | 455/456.1 |
| 6,728,637 | B2 | * | 4/2004 | Ford et al. | 701/213 |
| 6,845,239 | B1 | * | 1/2005 | Sato et al. | 455/456.1 |
| 6,847,325 | B2 | * | 1/2005 | Kim | 342/357.06 |

(Continued)

FOREIGN PATENT DOCUMENTS

EP    1455198 A2 *    9/2004

*Primary Examiner*—Thomas H. Tarcza
*Assistant Examiner*—Nga X Nguyen
(74) *Attorney, Agent, or Firm*—Roylance, Abrams, Berdo & Goodman, LLP

(57) ABSTRACT

A method and an apparatus for tracking a location of a UE by using an integrated GPS and TDOA scheme in a mobile communication network are provided. A GPS position solution of the UE is obtained using GPS code information. TDOA position solutions are obtained using pilot signal transmission times of BSs and pilot signal reception times of the UE, and an average value of the TDOA position solutions is calculated. The GPS position solution is subtracted from the average to obtain a position error value, and an iterative method using a least square method is performed for the position error value to correct the position error. The corrected position error value is added to the average value of the TDOA position solutions to obtain a more precise position solution.

20 Claims, 4 Drawing Sheets

U.S. PATENT DOCUMENTS

| | | | |
|---|---|---|---|
| 6,891,500 B2 * | 5/2005 | Hall et al. | 342/465 |
| 2003/0036849 A1 * | 2/2003 | Ford et al. | 701/213 |
| 2004/0027277 A1 * | 2/2004 | Diggelen et al. | 342/357.09 |
| 2004/0027278 A1 * | 2/2004 | Park | 342/357.14 |
| 2004/0110514 A1 * | 6/2004 | Kim et al. | 455/456.1 |
| 2004/0174297 A1 * | 9/2004 | Cho | 342/357.14 |
| 2005/0055160 A1 * | 3/2005 | King | 701/213 |
| 2005/0096066 A1 * | 5/2005 | Lee | 455/456.1 |
| 2005/0162308 A1 * | 7/2005 | Diggelen et al. | 342/357.06 |
| 2006/0033660 A1 * | 2/2006 | Dodson | 342/387 |
| 2006/0063537 A1 * | 3/2006 | Lee et al. | 455/456.1 |

* cited by examiner

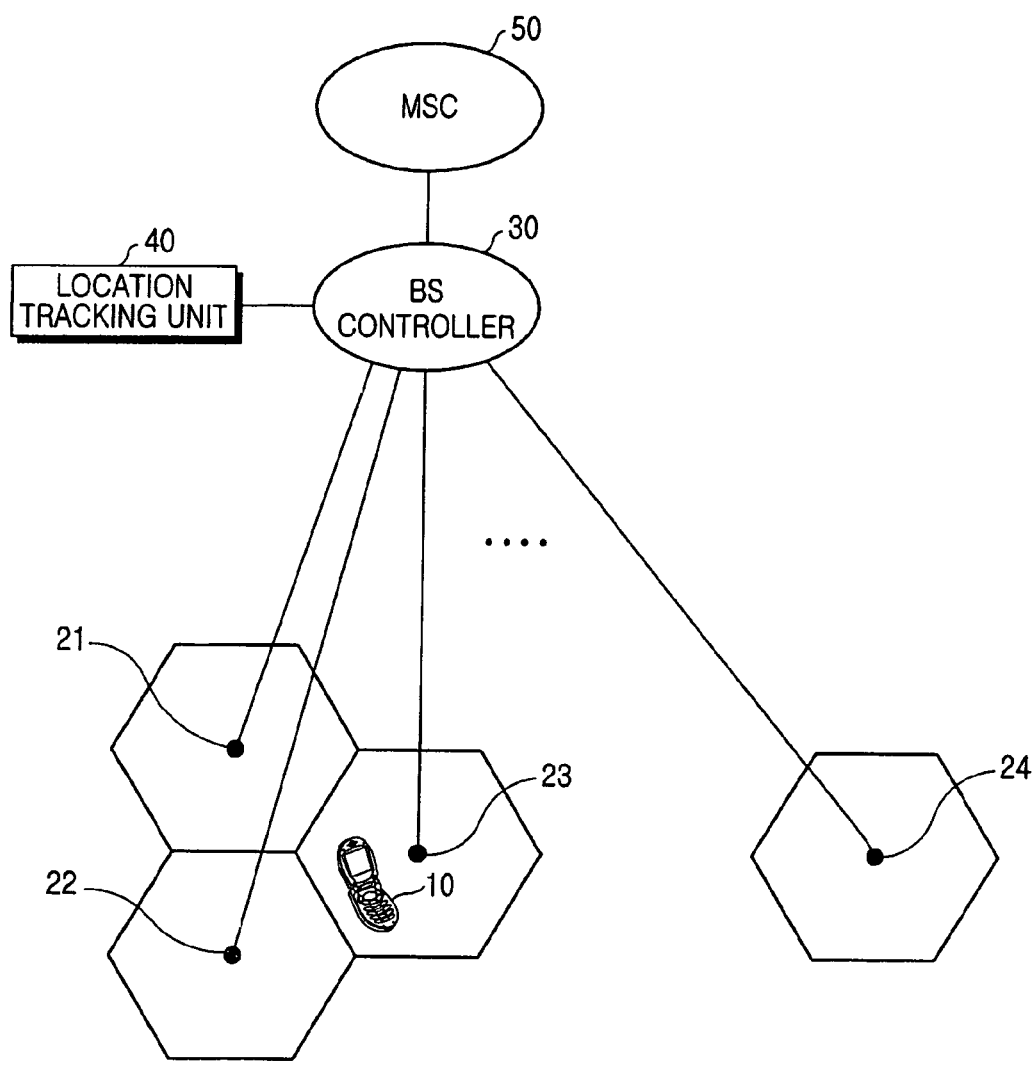
FIG.1
(CONVENTIONAL)

METHOD AND APPARATUS FOR TRACKING LOCATION OF USER EQUIPMENT BY USING INTEGRATED GPS AND TDOA SCHEME

PRIORITY

This application claims the benefit under 35 U.S.C. § 119 of a Korean Patent Applications Serial No. 2004-92152, filed in the Korean Industrial Property Office on Nov. 11, 2004, the entire contents of which are hereby incorporated by reference.

BACKGROUND OF THE INVENTION

1. Field of the Invention

The present invention relates to a location tracking method and a location tracking apparatus of a mobile communication system. More particularly the present invention relates to a location tracking method and a location tracking apparatus using an integrated Global Positioning System (GPS) and Time Difference Of Arrival (TDOA) scheme.

2. Description of the Related Art

As the modem society develops, personal portable communication is also rapidly advancing, and it is required to support a location based service (LBS) to a user equipment (UE) all over the world in order to provide emergency services such as an E-911 (emergency call) service. In particular, for the sake of the E-911 service, the United States of America prescribes the LBS as a basic function of the UE and recommends that the LBS be applied to all the UEs in future. Further, it is prescribed that the LBS of the UE should have an error within a range of 100 to 300 meters from an actual location so as to provide a comparatively precise location. Through the comparatively precise location of the UE, it is possible to provide various additional services related to location information.

FIG. 1 illustrates a mobile communication network architecture.

Referring to FIG. 1, the mobile communication network includes a plurality of base stations (BS) 21, 22, 23, 24 for providing mobile communication services to a mobile subscriber through a UE 10, a BS controller 30 for controlling the plurality of BSs, and a mobile switching center (MSC) 50 for connecting the BS controller 30 to another BS or public network.

The MSC 50 can reduce a time required for calling the mobile subscriber by detecting in which cell the mobile subscriber is located. However, in case of emergency, for example, when a fire or an urgent patient occurs, it is required to more precisely track a location of the mobile subscriber. Such more precise tracking of the mobile subscriber located in an arbitrary cell is called a location service. This location service is provided by a location tracking unit 40 which may be included in the BS controller 30 or exist separately.

A method for detecting a location of a UE in a mobile communication network is divided into two schemes, that is, a scheme in which location determination is carried out in a UE, and a scheme in which location determination is carried out in a mobile communication network.

A scheme using a GPS signal, which is one type of the former scheme, provides an precise absolute location of a UE by using satellite signals provided from a GPS satellite, so it has a tendency to be more increasingly used. However, although the GPS scheme provides an absolute location and high precision, it has a drawback in that signals are blocked in many areas.

In the latter scheme, at least three BSs transmit specific signals to a UE, and ranges between the respective BSs and the UE are obtained by using times of arrival, when the UE receives the signals, and times of departure, when the BSs transmit the signals. Next, based on the obtained ranges, a location of the UE is calculated using trigonometry. This scheme includes a Time Of Arrival (TOA) scheme and a TDOA scheme.

The TOA scheme uses ranges between BSs and a UE, which are calculated based on times taken to propagate specific signals from the UE to the BSs. That is, the UE is determined as located at an intersecting point of three circles, radiuses of which correspond to ranges between at least three BSs (21 to 23 in FIG. 1) and the UE, respectively. The TDOA scheme uses a set of points where time differences of arrival of signals, which at least three BSs receive from the UE, are constant, that is, a hyperbola. The UE is determined as located at an intersecting point of at least three hyperbolas. In comparison with the TOA scheme, the TDOA scheme is more complex, because the respective BSs must be exactly synchronized with each other. These TOA and TDOA schemes have a problem in that, since they use specific signals transmitted from the UE for location tracking, the transmitted signals may be delayed due to a multi-path, fading and so forth, and thus an actual location cannot be ensured.

Therefore, in order to solve this problem, a hybrids scheme, which simultaneously uses the GPS scheme providing an absolute location and the network scheme (TOA or TDOA) providing a continuous location, becomes necessary.

SUMMARY OF THE INVENTION

Accordingly, the present invention has been made to address at least the above-mentioned problems occurring in the prior art, and an object to provide a method and an apparatus for correcting a TDOA position solution by using GPS timing providing an absolute location in order to calculate location measurement of a UE.

The present invention facilitates a more reliable and precise continuous location measurement by providing a Kalman filter.

In order to accomplish at least the aforementioned object, in accordance with an exemplary aspect of the present invention, there is provided a method for tracking a location of a UE by using an integrated GPS and TDOA scheme in a mobile communication network, the method comprising obtaining a GPS position solution of the UE by using GPS code information, the GPS position solution being derived using a frequency corresponding to a clock period demultiplied by a chip rate of the mobile communication network, obtaining TDOA position solutions by using transmission times of pilot signals transmitted from a plurality of BSs and reception times of the pilot signals received to the UE, and calculating an average value of the TDOA position solutions, subtracting the GPS position solution from the average of the TDOA position solutions to obtain a position error value, and performing an iterative method using a least square method for the position error value to correct the position error value, and adding the corrected position error value to the average value of the TDOA position solutions to obtain a more precise position solution.

In accordance with another exemplary aspect of the present invention, there is provided an apparatus for tracking a location of a UE by using an integrated GPS and TDOA scheme in a mobile communication network, the apparatus comprising a GPS receiver unit for obtaining a GPS position solution of the UE by using GPS code information, a TDOA calculation unit for obtaining TDOA position solutions by using transmission times of pilot signals transmitted from a plurality of BSs and reception times of the pilot signals received at the UE, and calculating an average value of the TDOA position solutions, a weighted least square filter for subtracting the GPS position solution from the average of the TDOA position solutions to obtain a position error value, and performing an iterative method using a least square method for the position error value to correct the position error value, and an adder unit for adding the corrected position error value to the average value of the TDOA position solutions.

BRIEF DESCRIPTION OF THE DRAWINGS

The above and other exemplary objects, features and advantages of the present invention will be more apparent from the following detailed description taken in conjunction with the accompanying drawings, in which like reference numerals will be understood to refer to like parts, components and structures, where:

FIG. 1 is a view illustrating a conventional mobile communication network architecture;

DETAILED DESCRIPTION OF EXEMPLARY EMBODIMENTS

Figure 2:
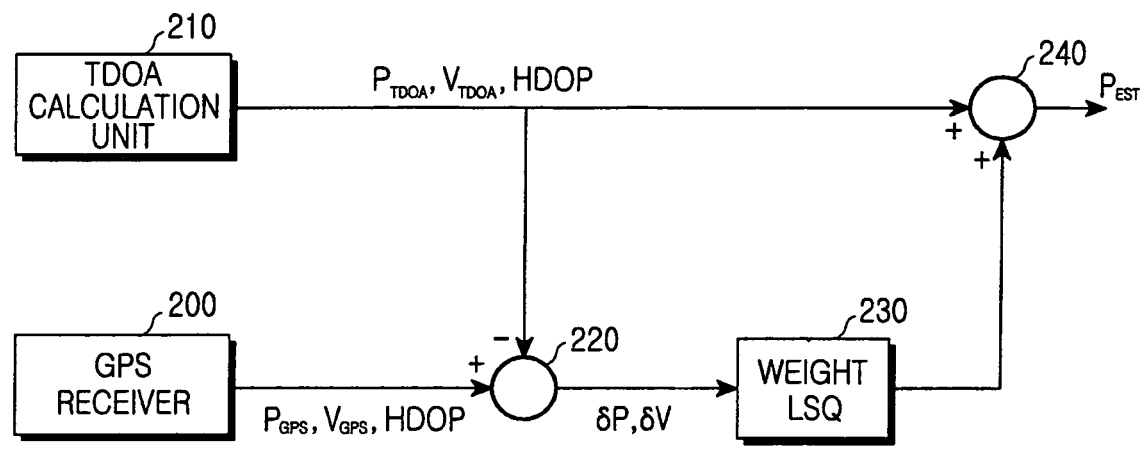
FIG. 2 is a schematic view illustrating a structure of a location tracking unit in accordance with an exemplary embodiment of the present invention.

Hereinafter, certain exemplary embodiments of the present invention will be described with reference to the accompanying drawings. As noted above, similar components are designated by similar reference numerals throughout the drawings. Also, in the following description, a detailed description of known functions and configurations incorporated herein has been omitted for clarity and conciseness. Herein, terms as will be described are defined in consideration of functions in the exemplary embodiments of the present invention, and may be altered according to intentions of an operator and a user, or by a convention. Therefore, one of ordinary skill in the art will understand that the definitions of the terms are to be interpreted in the context of the specification, as well as the general knowledge of those skilled in the art.

According to an exemplary implementation of the present invention a GPS scheme and a TDOA scheme are integrally used in such a manner that a pseudo-range between a BS and a UE is measured and then the measured pseudo-range is corrected by means of a Kalman filter to remove a position error component due to a multipath and fading, thereby providing a more precise pseudo-range.

FIG. 2 schematically illustrates a structure of a location tracking unit in accordance with an exemplary embodiment of the present invention.

Referring to FIG. 2, a GPS receiver 200 provides information about a position $P_{GPS}$, a velocity $V_{GPS}$ and Horizontal Dilution of Precision (HDOP) of a UE by using GPS code information. The HDOP information, a value representing precision of a measured position solution value, is used for deciding if the position solution is available and determining a weighted value through comparison with a predetermined threshold range. At this time, if the HDOP information is out of the predetermined threshold range, a corresponding measured position solution value is not used.

A TDOA calculation unit 210 measures a position solution $P_{TDOA}$ and a velocity $V_{TDOA}$ of the UE by using a difference between a reception time of a pilot signal received to the UE and a transmission time of the pilot signal transmitted from a BS.

A subtractor 220 derives a position error value from the position $P_{GPS}$ and the velocity $V_{GPS}$ obtained using the GPS information, and the position solution $P_{TDOA}$ and the velocity $V_{TDOA}$ obtained through the TDOA calculation unit 210. A weighted least square filter 230 corrects the position error value by means of iteration using a least square method. An adder 240 adds an output value of the weighted least square filter 230 to the position solution $P_{TDOA}$ and the velocity $V_{TDOA}$ to output a corrected position solution of the UE.

Hereinafter, an exemplary method for measuring a TDOA position solution in the TDOA calculation unit 210 will be described in detail.

Since the velocity of a radio wave is the same as the velocity of light, the TDOA representing a reception time difference of signals transmitted from BSs can be replaced by a pseudo-range difference between the UE and the BSs. A positioning scheme, in which a position is determined by measuring a relative difference between times of arrival from two signal sources, includes a forward link scheme consisting of a plurality of signal sources and one receiver, and a reverse link scheme consisting of one signal source and a plurality of receivers. According to a basic principle of the TDOA, a time difference of arrival proportional to a difference between ranges from two signal sources to a receiver is measured, and the receiver is located at spots where a difference between ranges from the two signal sources is constant, that is, on a hyperbola, focuses of which are the two signal sources. At this time, the respective BSs must be synchronized with each other, and time synchronization between the BSs is achieved using a GPS clock. Through this, two hyperbolas are derived form three signal sources, and an intersecting point of the two hyperbolas becomes a position of the receiver.

When the TDOA is used based on Code Division Multiple Access (CDMA) and Wideband CDMA (WCDMA) communication systems, the UE uses GPS time in order to receive pilot signals from the BSs. A modem of the UE demultiplies a frequency by using an GPS engine output, that is, 1 PPS (Pulse Per Second). To enhance a positioning precision, resolution of the demultiplied frequency is proportional to N times (N=1, 2, 3, . . . ) of a chip rate of the mobile communication system. In case of the WCDMA system, a frequency resolution of 61.44 Mega chips per second (Mcps), which corresponds to 16 times of a chip rate of 3.84 Mcps, is used.

Thus, frequency pulses demultiplied by 61.44 Mcps are counted to realize synchronization with GPS absolute time in a modem unit (not shown) of the UE. The modem unit of the UE measures a reception time of a pilot signal having a length of 10 msec according to a clock of 61.44 Mcps. The TDOA calculation unit 210 calculates a position solution by using the reception time. In a WCDMA system using a chip rate of 3.84 Mcps, the length of one chip corresponds to 78 meters on a range basis (3*10E8/3.84*10E6), it can be seen that a TDOA position solution has an error range of 4.6 meters.

Figure 3:
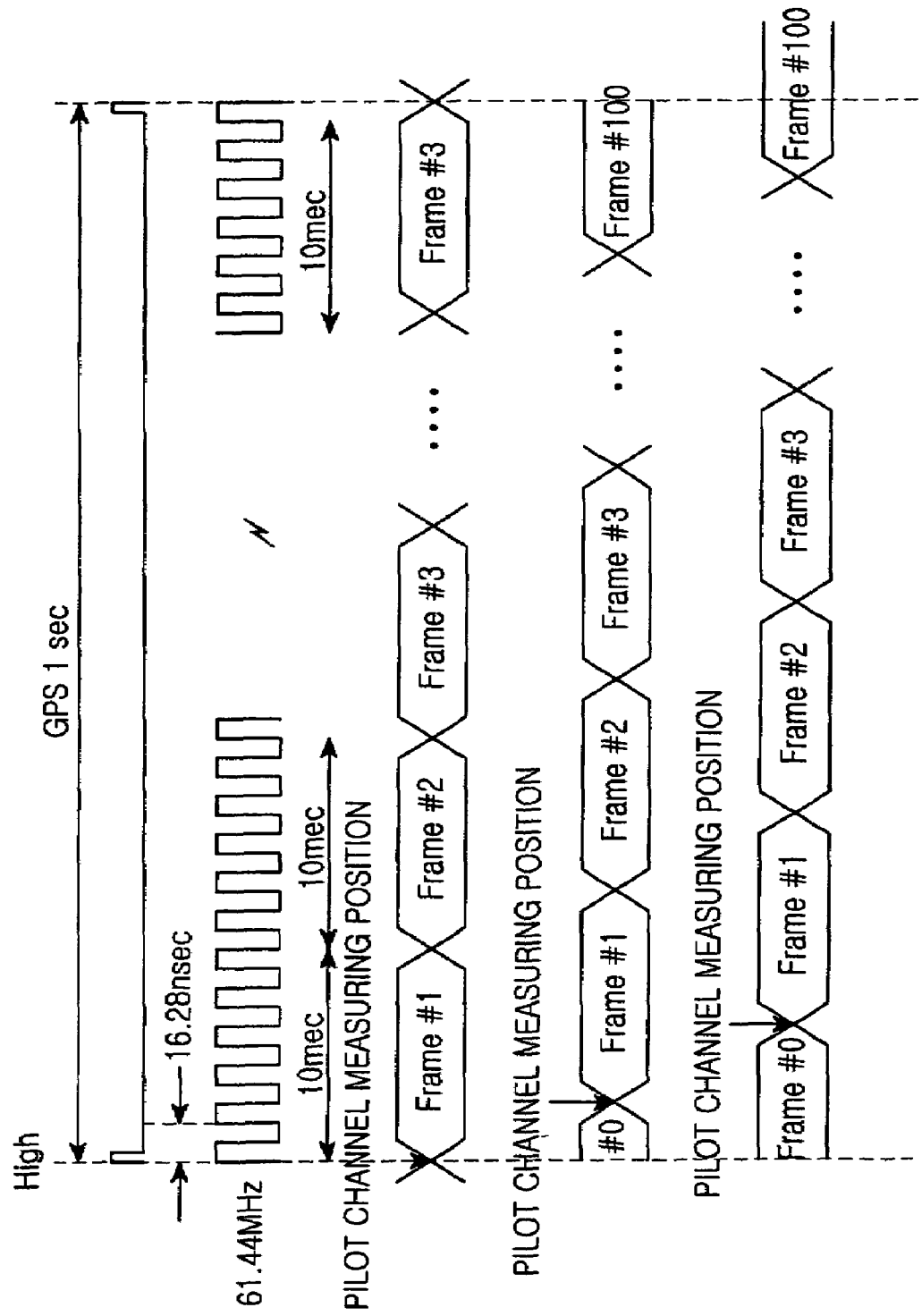
FIG. 3 is a view illustrating a relation between a reception time and GPS timing when a reception time of a pilot signal is measured using the GPS timing in accordance with an exemplary embodiment of the present invention.

FIG. 3 illustrates a relation between a reception time and GPS timing when a reception time of a pilot signal is measured using the GPS timing in accordance with an exemplary embodiment of the present invention.

Referring to FIG. 3, since the GPS code information has a period of 1 second, the GPS receiver 200 calculates a position solution $P_{GPS}$ every 1 second. The mobile communication system uses radio frames having a period of 10 msec, so the TDOA calculation unit 210 can measure max. 100 pilot signals and calculate max. 100 position solutions $P_{GPS}$ during 1 second. At this time, by using the demultiplied frequency of 61.44 Mcps during the GPS period of 1 second, the TDOA calculation unit 210 can more precisely measure an error of the position solution, which are caused by the fact that the calculation of the GPS position solution does not exactly agree with the calculation of the TDAO position solution, and estimate a delay range and a delay time due to the error.

Hereinafter, a description will be given for an exemplary process in which the weighted least square filter 230 estimates an error between a position solution of the GPS receiver and a position solution of the TDOA calculation unit. Here, equations used in the following description follow a general least square calculation method, thus omitting a detailed description thereof.

First, the TDOA calculation unit 210 calculates a TDOA position solution by using a pilot signal reception time of a source BS and a pilot signal reception time of a neighbor BS.

A pseudo-range($R_i$) between an i-th BS and a UE is defined as follows:

$$R_i = \sqrt{(x_{BSi}-x)^2 + (y_{BSi}-y)^2}, i=1,2,3 \quad (1)$$

where, $(x_{BSi}, y_{BSi})$ is a geographical position of the i-th BS, and $(x, y)$ is an estimated position of the UE. The pseudo-range $R_i$ is calculated by measuring a difference between a pilot signal reception time of the UE and a pilot signal transmission time of the BS through a GPS timing count value. The pseudo-range is regarded as a two-dimensional position solution of the UE.

The TDOA calculation unit 210 derives a hyperbola equation by mutually subtracting time differences of arrival between the source BS ($R_1$) and the neighbor BSs ($R_i$). The following equation (2) expresses a difference between measured pseudo-ranges of the source BS and the i-th BS:

$$R_{i,1} = R_i - R_1 = \sqrt{(x_{BS,i}-x)^2 + (y_{BS,i}-y)^2} - \sqrt{(x_{BS,1}-x)^2 + (y_{BS,1}-y)^2}, i=2,3,4 \quad (2)$$

If the UE maintains the same position, the TDOA calculation unit 210 can acquire max. 100 samples of the pseudo-range during 1 second when radio frames having a period of 10 msec are used. A sample average of the max. 100 samples is calculated as follows:

$$\text{sample average} = \frac{1}{N}\sum_{i=1}^{\infty}(R_{i+1,1}), \quad (3)$$
$$i = 1, \ldots \infty, N = (1, 2, \ldots 100)$$

At this time, when the UE moves at a velocity of 5 to 100 km/h, it can travel a range of 1.4 to 28 m per second. That is, since the range between the UE and the BS changes due to the movement of the UE, such a change may have an influence on the sample average. However, when the UE moves at a high velocity, the sample average can be corrected using velocity information acquired through the GPS code information.

In order to estimate an error value between the GPS position value and the TDOA position solution, the weighted least square filter 230 is used. The weighted least square filter 230 is generally used in the GPS receiver, and statistically analyzes coded information such as satellite information. Thus, it can detects a good result for a weak reception signal even when some radio disturbances occur due to obstacles, is excellent in separating a signal from a noise, prevents an instantaneous jump phenomenon, and precisely detects a position, a velocity and a time.

To be specific, Equation (2) calculated in the TDOA calculation unit is linearized by taking a Taylor series of an initial position ($U_0 = [x_0, y_0]^T$) of the UE in the position determination equation using the GPS code information, that is, Equation (1), and a linearized measurement equation for a i-th BS signal can be obtained as follows:

$$\delta z_i = h_i^T \cdot \delta U_i + cB + w_i \quad (4)$$

The following equation is a linearized equation of difference equations between i BS signals and a GPS signal:

$$\delta z = \begin{bmatrix} h_1^T & 1 \\ \vdots & \vdots \\ h_i^T & 1 \end{bmatrix} \begin{bmatrix} \delta U \\ cB \end{bmatrix} + w = A\delta U + w \quad (5)$$

In Equation (4), "$z_i$" is an observed value of a position solution, that is, a measured value of a pseudo-range between the UE and the BS and the GPS satellite, and "$h_i$" is a conversion factor according to linearization. Also in Equation (4), "$w_i$" is system errors of the i BSs and the GPS signal, and represents a white noise occurring due to a multipath and fading in a given environment.

A line of sight vector (LOS) vector, "$h_i^T$", is a matrix designed from partial differentiations for position solutions of i BSs, and is calculated as follows:

$$\delta h_i^T = \frac{\partial z_i}{\partial U}\bigg|_{U_0} = \begin{bmatrix} \frac{x_0 - x_{BS,i+1}}{R_{i+1}|_{U_0}} - \frac{x_0 - x_{BS,i}}{R_i|_{U_0}} - \frac{x_0 - x_{SV,i}}{\rho_i|_{U_0}} \\ \frac{y_0 - y_{BS,i+1}}{R_{i+1}|_{U_0}} - \frac{y_0 - y_{BS,i}}{R_i|_{U_0}} - \frac{y_0 - y_{SV,i}}{\rho_i|_{U_0}} \end{bmatrix}^T \quad (6)$$

In Equation (5), "cB" is a clock bias value of the UE.

"W" is a matrix consisting of elements $w_i$ is used as a $Q_{DTG}$ variable denoting a difference covariance of a TDOA position solution and a GPS position solution in the weighted least square filter.

"$\rho_i$" denotes a range between the GPS satellite and the UE, "$R_i$" is the sample average calculated through Equation (3), and $(x_{sv}, y_{sv})$ is a GPS satellite coordinates. "$\delta U$" is an error value for the initial position of the UE and is calculated as an error value between "$R_i$" and "$\rho_i$".

A position and receiver clock bias, "$\delta \hat{U}$", is obtained as follows:

$$\delta \hat{U} = (A^T A)^{-1} A^T \delta z \quad (7)$$

A calculation according to Equation (7) may be iteratively performed so as to enhance precision. In Equation (7), "A" denotes a state transition matrix, $$A = \begin{bmatrix} A_{i,1} \\ A_{i,2} \\ \vdots \\ A_i \end{bmatrix}.$$

A weighted least square adjustment solution for Equation (7) and an estimated initial position covariance matrix are as follows:

$$\delta \hat{U} = (A^T Q_{DTG}^{-1} A)^{-1} A^T Q_{DTG}^{-1} \delta z$$

$$\Sigma \delta \hat{U} = \hat{\sigma}_0^2 (A^T Q_{DTG}^{-1} A)^{-1} \quad (8)$$

Here, "$Q_{DTG}$" is expressed as follows:

$$Q_{DTG} = TG\, \text{cov}(TDOA) TG^T \quad (9)$$

where "cov(TDOA)=Ccov(R)C", "C" is a TDOA difference matrix, cov(R) is a covariance of noises measured between the BS and the UE, "R" is an error value, and TG(TDOA & GPS) is a TDOA and GPS difference matrix which represents a difference of white noises occurring according to subtraction between the BS and the GPS.

In Equation (8), using a remained value or a remainder after the least square method, a posterior variance for the error of the position solution is estimated as follows:

$$\hat{\sigma}_0^2 = \frac{\hat{v}^T P \hat{v}}{n-m} \quad (10)$$

Here, "n" denotes the number of observed BSs, "m" denotes the number of unknown quantities, "$\hat{v} = R_{i+1,1} - \rho_i - A\delta\hat{U}$" denotes the remainder, and "P" denotes the number of weighted value matrix obtained under the condition that a priori variance is 1.

As stated above, according to an exemplary implementation of an embodiment of the present invention, an error between a position of a UE, which is measured through a GPS satellite, and a TDOA position solution is corrected using a least square filter, so a more precise position solution can be obtained.

Figure 4:
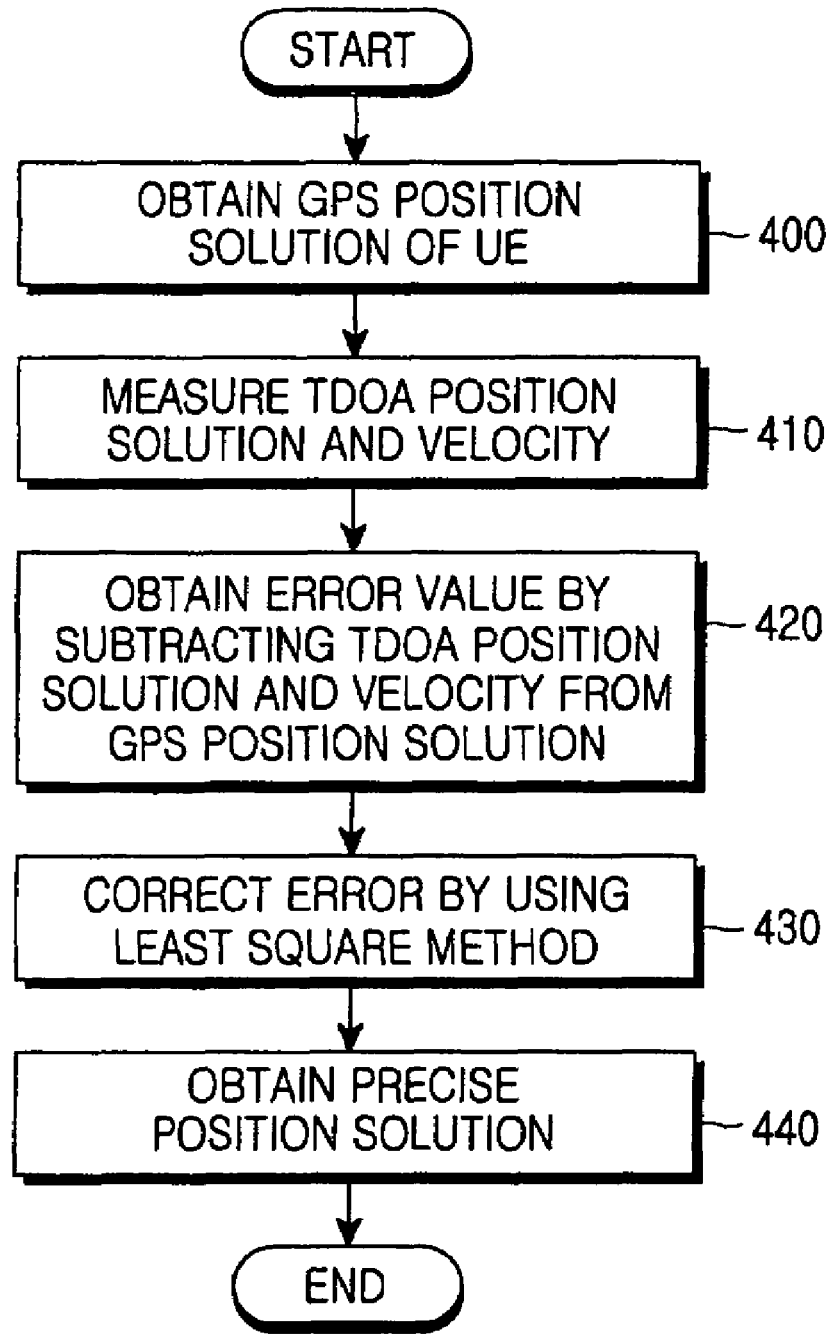
FIG. 4 is a flowchart illustrating procedures of obtaining a position solution in a location tracking unit in accordance with an exemplary embodiment of the present invention.

FIG. 4 illustrating procedures of obtaining a position solution in a location tracking unit in accordance with an exemplary embodiment of the present invention.

Referring to FIG. 4, in step 400, the location tracking unit obtains a GPS position solution of a UE, including an absolute position $P_{GPS}$ and HDOP information of the UE, by using GPS code information.

In step 410, the location tracking unit measures TDOA position solutions $P_{TDOA}$ and a velocity $V_{TDOA}$ by using differences between transmission times of pilot signals transmitted from a plurality of BSs and reception times of the pilot signals received to the UE.

In step 420, the location tracking unit subtracts the TDOS position solution and the velocity from the GPS position solution to obtain a position error value. In step 430, the location tracking unit performs an iterative method using a least square method for the position error value to correct the position error value.

In step 440, the location tracking unit adds the corrected position error value to the TDOA position solution and the velocity to obtain a more precise position solution.

As described above, the present invention may solve a position error of a UE or an unsettled position solution, which may occur when a GPS technique or a TDOA technique is separately used. Also, by correcting a position error value between a GPS position solution and a TDOA position solution through a least square filter, exemplary implementations of the present invention can ensure positioning reliability and position precision.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for tracking a location of a user equipment (UE) by using an integrated Global Positioning System (GPS) and Time Difference Of Arrival (TDOA) scheme in a mobile communication network, the method comprising the steps of:

obtaining a GPS position solution of the UE by using GPS code information, the GPS position solution being derived using a frequency corresponding to a clock period demultiplied by a chip rate of the mobile communication network;

obtaining TDOA position solutions by using transmission times of pilot signals transmitted from a plurality of base stations (BSs) and reception times of the pilot signals received at the UE, and calculating an average value of the TDOA position solutions;

obtaining a corrected position error value by subtracting the GPS position solution from the average of the TDOA position solutions to obtain a position error value, and performing an iterative method using the position error value; and adding the corrected position error value to the average value of the TDOA position solutions.

2. The method as claimed in claim 1, wherein the iterative method is performed using a least square method.

3. The method as claimed in claim 1, wherein the reception time of the UE is obtained using a frequency corresponding to a GPS clock period demultiplied by a chip rate of the mobile communication network.

4. The method as claimed in claim 2, wherein the demultiplied frequency is 61.44 Mcps.

5. The method as claimed in claim 1, wherein the correction step comprises, for the calculated position solutions and the absolute position, performing a linearization through a Taylor series of an initial position of the UE, wherein $$\delta z = \begin{bmatrix} h_1^T & 1 \\ \vdots & \vdots \\ h_i^T & 1 \end{bmatrix} \begin{bmatrix} \delta U \\ cB \end{bmatrix} + w = A\delta U + w$$

where $z_1$ is an observed value of the position solution, $h_1$ is a conversion factor according to the linearization, $w_i$ is system errors of i BSs and a GPS signal, $h_i^T$ is a matrix designed from partial differentiations for position solutions of the i BSs, and cB is a clock bias value of the UE.

6. The method as claimed in claim 4, wherein calculation of $h_i^T$ comprises using an equation $$\delta h_i^T = \frac{\partial z_i}{\partial U}\bigg|_{U_0} = \begin{bmatrix} \frac{x_0 - x_{BS,i+1}}{R_{i+1}|_{U_0}} - \frac{x_0 - x_{BS,i}}{R_i|_{U_0}} - \frac{x_0 - x_{SV,i}}{\rho_i|_{U_0}} - \\ \frac{y_0 - y_{BS,i+1}}{R_{i+1}|_{U_0}} - \frac{y_0 - y_{BS,i}}{R_i|_{U_0}} - \frac{y_0 - y_{SV,i}}{\rho_i|_{U_0}} \end{bmatrix}^T$$

where $\rho_i$ denotes a range between the GPS satellite and the UE, $R_i$ is a sample average of the TDOA position solutions, $(x_{sv}, y_{sv})$ is a GPS satellite coordinates, and $\partial U$ is an error value for the initial position of the UE and is calculated as an error value between $R_1$ and $\rho_1$.

7. The method as claimed in claim 4, further comprising iteratively performing a calculation using equation, $$\delta \hat{U} = (A^T A)^{-1} A^T \delta z$$

where A denotes a state transition matrix, $$A = \begin{vmatrix} A_{i,1} \\ A_{i,2} \\ \vdots \\ A_i \end{vmatrix}.$$

8. The method as claimed in claim 5, wherein calculating a weighted least square adjustment solution for the equation and an estimated initial position covariance matrix comprises using $$\delta \hat{U} = (A^T Q_{DTG}^{-1} A)^{-1} A^T Q_{DTG}^{-1} \delta z$$

$$\Sigma \delta \hat{U} = \hat{\sigma}_0^2 (A^T Q_{DTG}^{-1} A)^{-1}.$$

9. The method as claimed in claim 7, wherein $Q_{DTG}$ is a variable of w representing a difference covariance matrix of TDOA pseudo-ranges and GPS code pseudo-ranges the weighted least square filter, wherein, $$Q_{DTG} = TG \, \text{cov}(TDOA) TG^T$$

where, $\text{cov}(TDOA) = C \text{cov}(R) C$, C is a TDOA difference matrix, $\text{cov}(R)$ is a covariance of noises measured between the BS and the UE, R is an error value of the position solution, and TG is a TDOA and GPS difference matrix.

10. The method as claimed in claim 8, wherein in the equation, using a remained value or a remainder after the least square method, a posterior variance estimation comprises using equation, $$\hat{\sigma}_0^2 = \frac{\hat{v}^T P \hat{v}}{n - m}$$

where, n is the number of observed BSs, m is the number of unknown quantities, $\hat{v} = R_{i+1,1} - \sigma_i - A \delta \hat{U}$ is the remainder, and P is a weighted value matrix obtained under the condition that a priori variance is 1.

11. An apparatus for tracking a location of a user equipment (UE) by using an integrated Global Positioning System (GPS) and Time Difference Of Arrival (TDOA) scheme in a mobile communication network; the apparatus comprising:
 a GPS receiver unit for obtaining a GPS position solution of the UE by using GPS code information;
 a TDOA calculation unit for obtaining TDOA position solutions by using transmission times of pilot signals transmitted from a plurality of base stations (BSs) and reception times of the pilot signals received at the UE, and calculating an average value of the TDOA position solutions;
 a weighted least square filter for obtaining a corrected position error value by subtracting the GPS position solution from the average of the TDOA position solutions to obtain a position error value, and performing an iterative method using the position error value; and
 an adder unit for adding the corrected position error value to the average value of the TDOA position solutions.

12. The apparatus as claimed in claim 11, wherein the iterative is performed using a least square method.

13. The apparatus as claimed in claim 11, wherein the reception time of the UE is obtained using a frequency corresponding to a GPS clock period demultiplied by a chip rate of the mobile communication network.

14. The apparatus as claimed in claim 11, wherein the demultiplied frequency is 61.44 Mcps.

15. The apparatus as claimed in claim 11, wherein for the calculated position solutions and the absolute position, the weighted least square filter performs linearization through a Taylor series of an initial position of the UE, and the linearization is using equation $$\delta z = \begin{bmatrix} h_1^T & 1 \\ \vdots & \vdots \\ h_i^T & 1 \end{bmatrix} \begin{bmatrix} \delta U \\ cB \end{bmatrix} + w = A \delta U + w$$

where $z_i$ is an observed value of the position solution $h_i$ is a conversion factor according to the linearization, $w_i$ is system errors of i BSs and a GPS signal, $h_i^T$ is a matrix designed from partial differentiations for position solutions of the i BSs, and cB is a clock bias value of the UE.

16. The apparatus as claimed in claim 13, wherein calculation of $h_i^T$ comprises using an equation $$\delta h_i^T = \frac{\partial z_i}{\partial U} \bigg|_{U_0}$$

$$= \begin{bmatrix} \frac{x_0 - x_{BS,i+1}}{R_{i+1}}\bigg|_{U_0} - \frac{x_0 - x_{BS,i}}{R_i}\bigg|_{U_0} - \frac{x_0 - x_{SV,i}}{\rho_i}\bigg|_{U_0} - \\ \frac{y_0 - y_{BS,i+1}}{R_{i+1}}\bigg|_{U_0} - \frac{y_0 - y_{BS,i}}{R_i}\bigg|_{U_0} - \frac{y_0 - y_{SV,i}}{\rho_i}\bigg|_{U_0} \end{bmatrix}^T$$

where $\sigma_i$ denotes a range between the GPS satellite and the UE, $R_i$ is a sample average of the TDOA position solutions, $(x_{sv}, y_{sv})$ is a GPS satellite coordinates, and $\partial U$ is an error value for the initial position of the UE and is calculated as an error value between $R_i$ and $\sigma_1$.

17. The apparatus as claimed in claim 13, wherein the weighted least square filter further performs an iterative calculation using an equation, $$\delta \hat{U} = (A^T A)^{-1} A^T \delta z$$

where A denotes a state transition matrix, $$A = \begin{vmatrix} A_{i,1} \\ A_{i,2} \\ \vdots \\ A_i \end{vmatrix}.$$

18. The apparatus as claimed in claim 15, wherein calculating a least square adjustment solution for the equation and an estimated initial position covariance matrix comprises using $$\delta \hat{U} = (A^T Q_{DTG}^{-1} A)^{-1} A^T Q_{DTG}^{-1} \delta z$$

$$\Sigma \delta \hat{U} = \hat{\sigma}_0^2 (A^T Q_{DTG}^{-1} A)^{-1}.$$

19. The apparatus as claimed in claim 16, wherein "$Q_{DTG}$" is a variable of w representing a difference covariance matrix of TDOA pseudo-ranges and GPS code pseudo-ranges the weighted least square filter, wherein, $$Q_{DTG} = TG \, \text{cov}(TDOA) TG_T$$

where $\text{cov}(TDOA) = C \text{cov}(R) C$, C is a TDOA difference matrix, $\text{cov}(R)$ is a covariance of noises measured between the BS and the UE, R is an error value of the position solution, and TG is a TDOA and GPS difference matrix.

20. The apparatus as claimed in claim 16, wherein in the equation, using a remained value or a remainder after the least square method, a posterior variance estimation comprises using equation, $$\hat{\sigma}_0^2 = \frac{\hat{v}^T P \hat{v}}{n-m}$$

where, n is the number of observed BSs, m is the number of unknown quantities, $\hat{v}=R_{i+1,1}-\sigma_i-A\delta\hat{U}$ is the remainder, and P is a weighted value matrix obtained under the condition that priori variance is 1.

* * * * *